United States Patent [19]

Zafferri et al.

[11] Patent Number: 5,579,290
[45] Date of Patent: Nov. 26, 1996

[54] EPICYCLOIDAL STEP MOTOR

[75] Inventors: Roberto Zafferri, Sorengo; Marco Brandestini, Montagnola, both of Switzerland

[73] Assignee: R. Audemars SA, Cadempino, Switzerland

[21] Appl. No.: 535,944

[22] Filed: Sep. 28, 1995

[30] Foreign Application Priority Data

Oct. 3, 1994 [CH] Switzerland .......................... 02983/94

[51] Int. Cl.$^6$ .......................... G04B 19/00; H02K 37/00; H02N 1/00
[52] U.S. Cl. .................... 368/76; 368/160; 310/40 MM; 310/82; 310/309
[58] Field of Search .................... 368/76, 80, 155–157, 368/159, 160; 310/40 MM, 49, 82, 309

[56] References Cited

U.S. PATENT DOCUMENTS

| | | | |
|---|---|---|---|
| 2,761,079 | 8/1956 | Giertz | 310/82 |
| 3,452,227 | 6/1969 | Welch | 310/82 |
| 3,984,972 | 10/1976 | Yoshino | 368/160 |
| 4,048,548 | 9/1977 | Nakajima et al. | 310/40 MM |
| 5,093,594 | 3/1992 | Mehregany | 310/82 |
| 5,237,234 | 8/1993 | Jebens et al. | 310/309 |

FOREIGN PATENT DOCUMENTS

| | | |
|---|---|---|
| 0038744 | 10/1981 | European Pat. Off. . |
| 2612013 | 9/1988 | France . |
| 2612014 | 9/1988 | France . |

*Primary Examiner*—Vit W. Miska
*Attorney, Agent, or Firm*—Marks & Murase L.L.P.

[57] ABSTRACT

The stator of the motor comprises two pole pieces (1, 2) which are axially staggered. An axially magnetized cylindrical rotor (5) is disposed in the openings or bores of said pole pieces. The rotor (5) is provided with an external toothing (3) which is continuously engaged with an internal toothing (4) of the stator. In the unexcited stator, the rotor (5) assumes a stable position by attraction to the pole pieces (1, 2). Due to the excitation of the stator by a pulse having a suitable polarity, the rotor is displaced to a diametrically opposed stable position. The toothings (3, 4) stay in engagement during said displacement, resulting in an angular displacement of the rotor, the angle being defined by the difference of the number of teeth of said toothings (3, 4). The motor allows a miniaturization and a simple control by alternating pulses of opposed polarities.

13 Claims, 6 Drawing Sheets

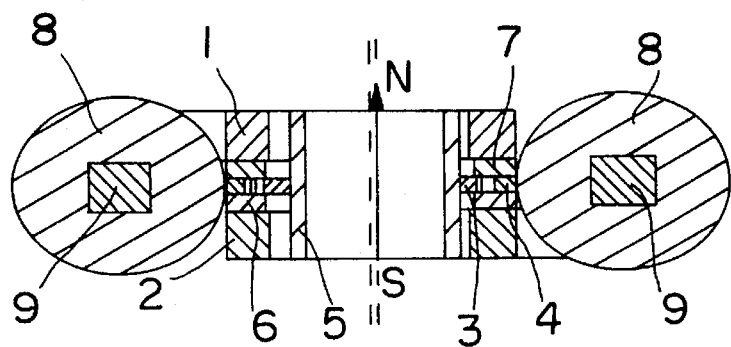
FIG. I
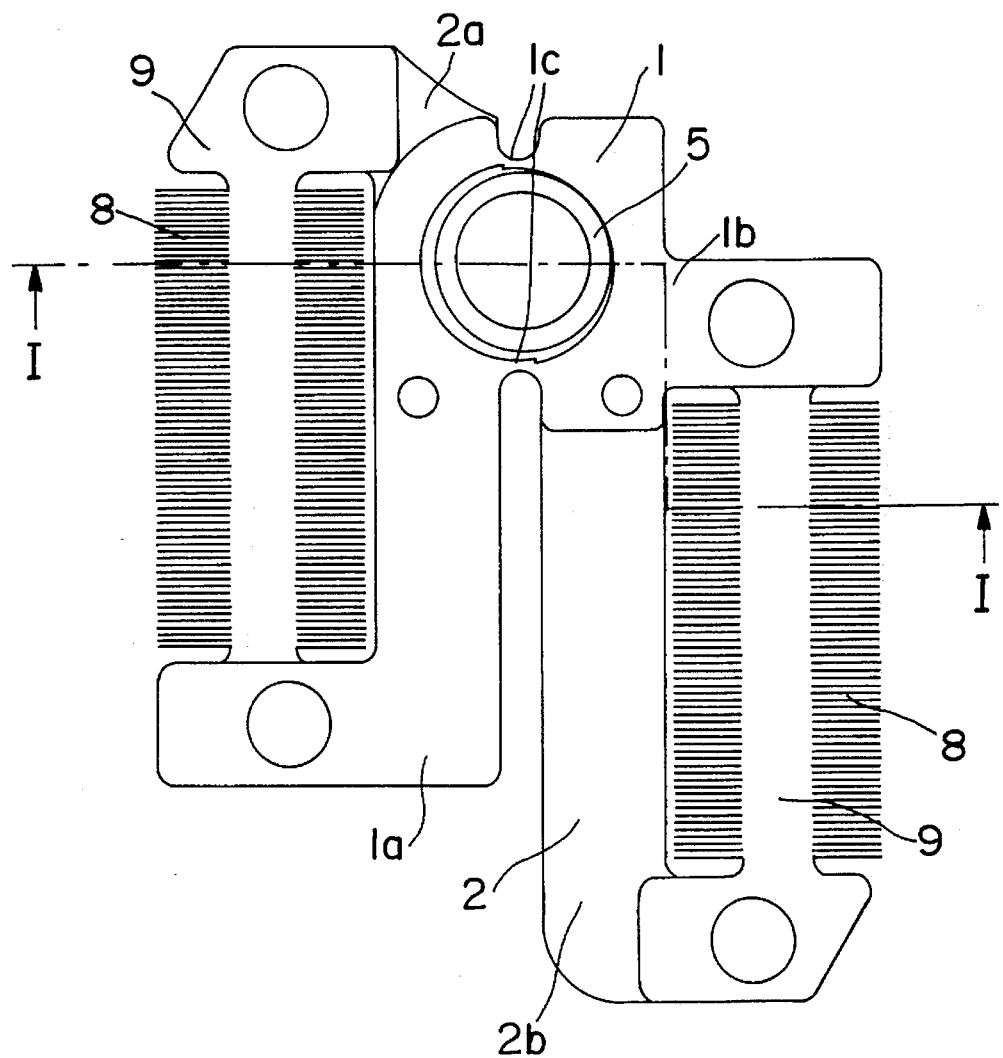
FIG. 2

EPICYCLOIDAL STEP MOTOR

BACKGROUND OF THE INVENTION

The present invention refers to an epicycloidal step motor, comprising a rotor having an external toothing which is in engagement with an internal toothing of a stator. Motors of this type having large dimensions and polyphase excitation are known. However, their success has been limited, and it is difficult to miniaturize them and to simplify their control for an application in watchmaking.

SUMMARY OF THE INVENTION

It is an object of the present invention to provide an epicycloidal step motor of small dimensions which is efficient and simple in its design, and which is capable of being used in a watch wherein the rotor of the motor is directly coupled to the seconds hand or to the minute hand. This object is attained in that the stator comprises pole pieces defining stable positions of the rotor and displacements of the rotor between these stable positions, said toothings being in permanent engagement during said displacements.

BRIEF DESCRIPTION OF THE DRAWINGS

The invention is explained in more detail hereinafter with reference to a drawing of an embodiment of the motor.

FIG. 1 shows a cross-section according to line I—I in FIG. 2;

FIG. 2 is a lateral view with the coils shown in cross-section;

DETAILED DESCRIPTION OF THE INVENTION

Figure 3:
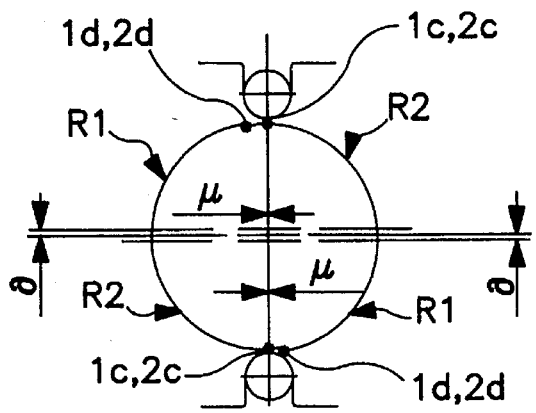
FIG. 3 shows the geometry of the opening or bore of the stator.

The stator of the motor comprises two pole pieces 1 and 2 which are axially staggered and have equal openings or bores whose shape is indicated in FIG. 3. The two pole pieces have restrictions 1c, 2c connecting two essentially semi-cylindrical zones of said openings of the pole pieces. However, the two semi-cylindrical zones are formed of two portions with slightly different radii R1, R2 and slightly different eccentricities δ and μ, respectively, resulting in an opening having shoulders 1d, 2d. Between the two pole pieces 1 and 2, the stator is provided with an inner toothing 4 which is in engagement with an external toothing 3 of rotor 5. Rotor 5 is a hollow cylinder which is axially magnetized (N–S) as shown in FIG. 1. Between pole pieces 1 and 2 and toothings 3 and 4, rings 6 and 7 of a suitable material are provided which form an axial bearing for the toothing 3 of rotor 5. However, these bearings allow a free move-ment of the rotor in the radial direction. The stator comprises two coils 8 disposed on cores 9 which are connected to pole pieces 1 and 2 by bridges 1a, 1b, 2a, and 2b. Rotor 5 is coupled to a member to be actuated, e.g. the hand of a watch, by means of a non-represented coupling. Since rotor 5 is displaced according to an epicycloidal movement where a rotation is superimposed on radial displacements, said coupling must allow a relative radial displacement between rotor 5 and the driven element. Coils 8 are connected in series or in parallel and excited in common in such a manner that the two coils excite pole pieces 1 and 2 alternatingly in an opposed polarity. This means that coils 8 are alternatingly supplied with pulses having opposed polarities, so that the motor can be controlled by a usual watch electronics.

Figure 6A:
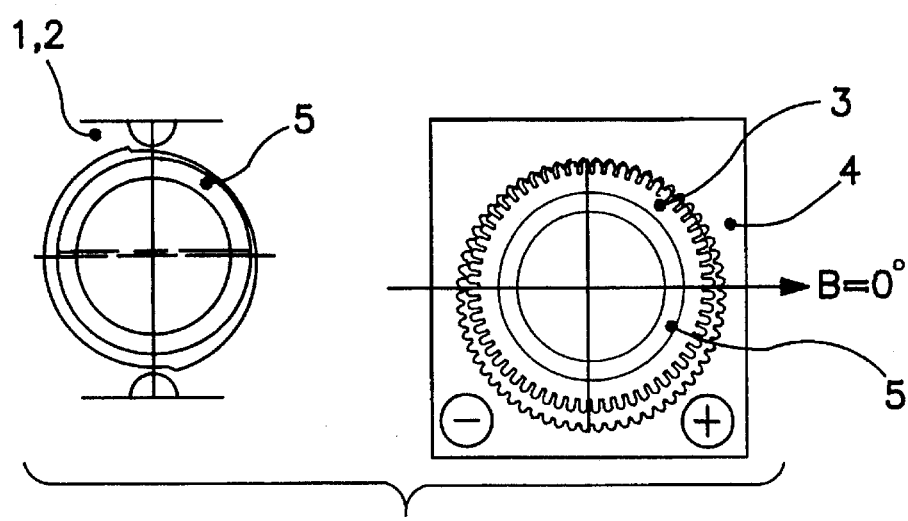
FIG. 6 shows several positions of the rotor in the stator.
Figure 6B:
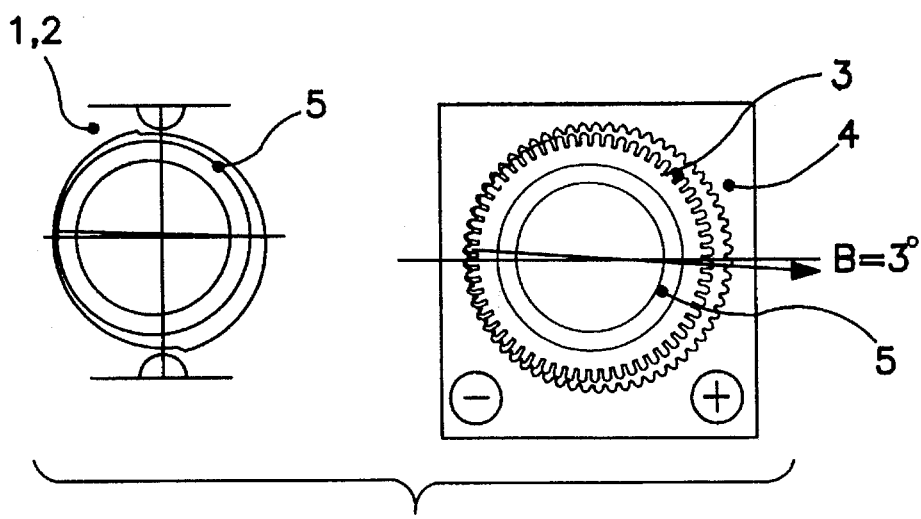
Figure 6C:
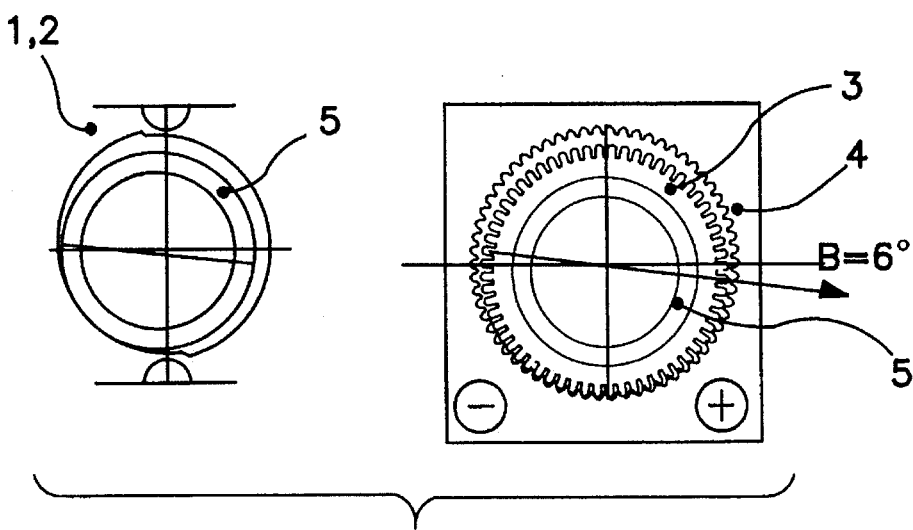
Figure 6D:
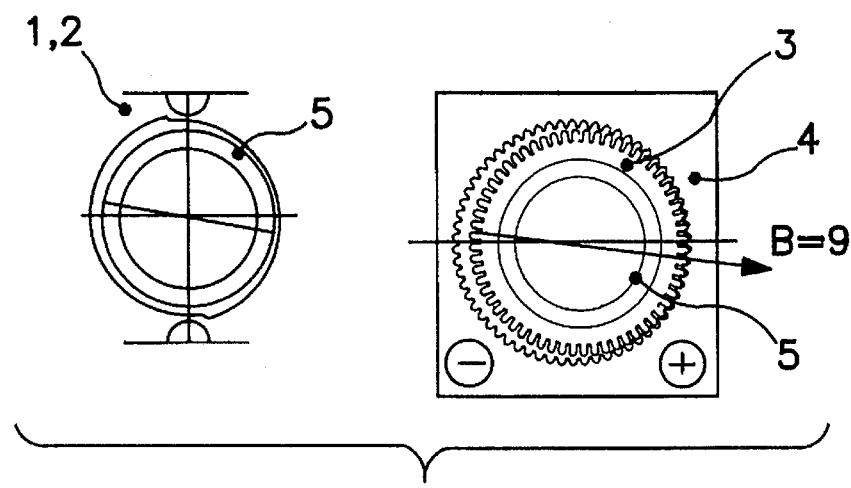
Figure 6E:
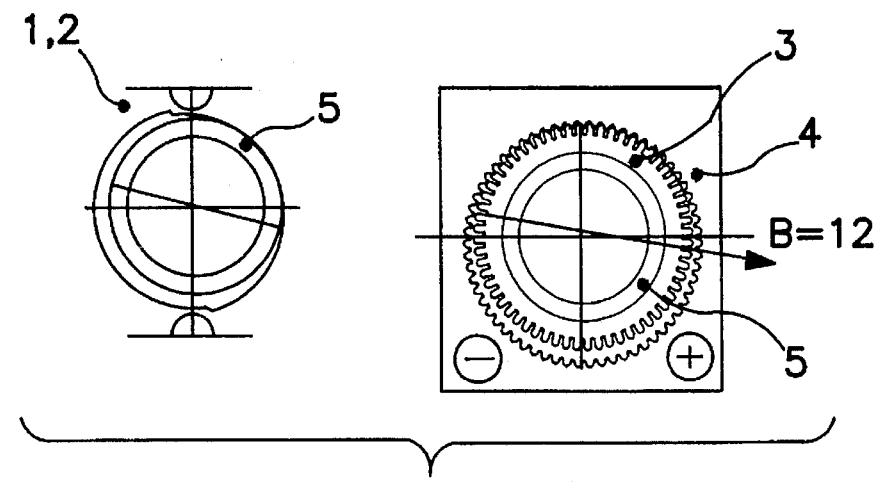

FIGS. 2 and 6a show a stable position of the rotor in the stator. Due to its permanent magnetization, the rotor is attracted to pole pieces 1 and 2 which are unexcited. According to FIG. 6a, this position of the rotor corresponds to a position 0 of the angular position of the rotor. With the next excitation of the stator, the rotor is displaced to the position shown in FIG. 6b. During this displacement, toothings 3 and 4 stay in engagement, and the angular position of the rotor is changed by 3°, for example. By the end of the excitation pulse, the rotor moves to the stable position of FIG. 6c. The total angular displacement of the rotor during its displacement from the position of FIG. 6a to the diametrically opposed position according to FIG. 6c amounts to 6°. If the rotor is directly coupled to a seconds hand or a minute hand, this displacement, which is produced by one control pulse, corresponds to a displacement of the hand by a second or a minute respectively. The rotor is moved to the position of FIG. 6d by the next excitation pulse and after said pulse returns to the initial position according to FIG. 6a resp. 6e. The angular position of the rotor has been displaced again by 6° by said driving pulse.

Figure 4:
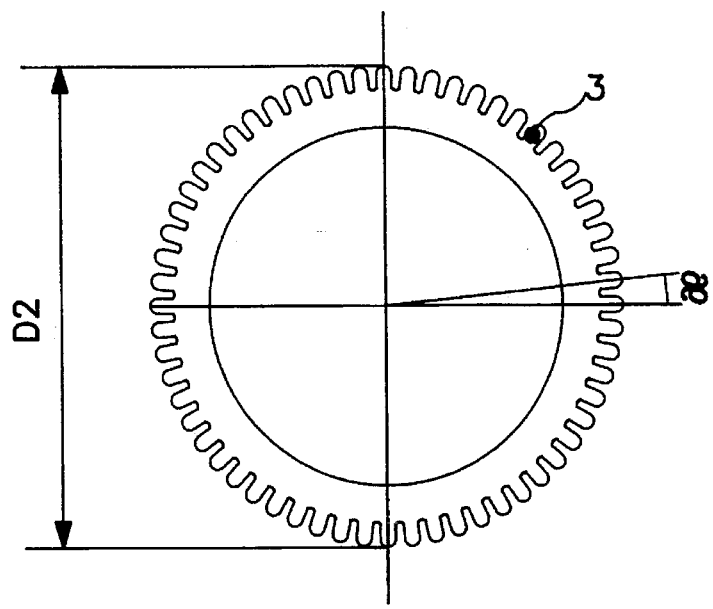
FIGS. 4 and 5 show the toothings of the rotor and of the stator, respectively.
Figure 5:
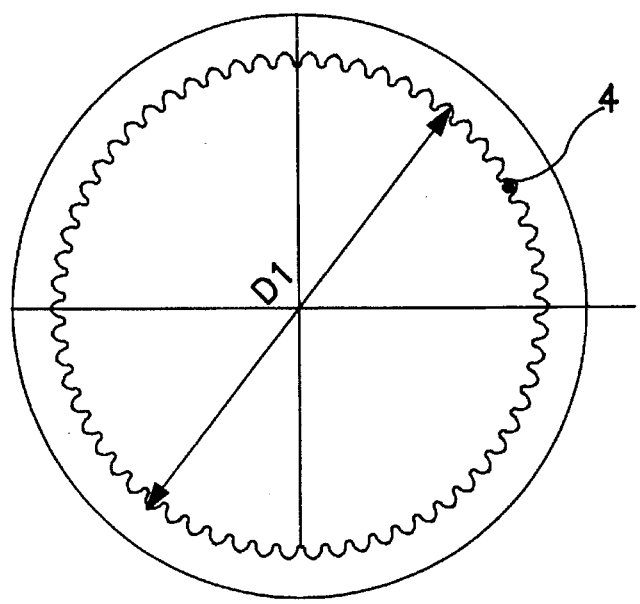

FIGS. 4 and 5 indicate the geometry of toothings 3 and 4. If

N1=number of teeth of the stator N2=number of teeth of the rotor D1=external diameter of the stator D2=bottom diameter of the rotor toothing a=angular pitch of the rotor teeth, the relations connecting these dimensions in a watchmaking application are $$N1-N2>1$$

$$\alpha=12°/(N1-N2)$$

and, generally, $$D1/D2=/N2.$$

The latter dimensions may slightly vary in order to compensate for manufacturing tolerances.

Figure 7:
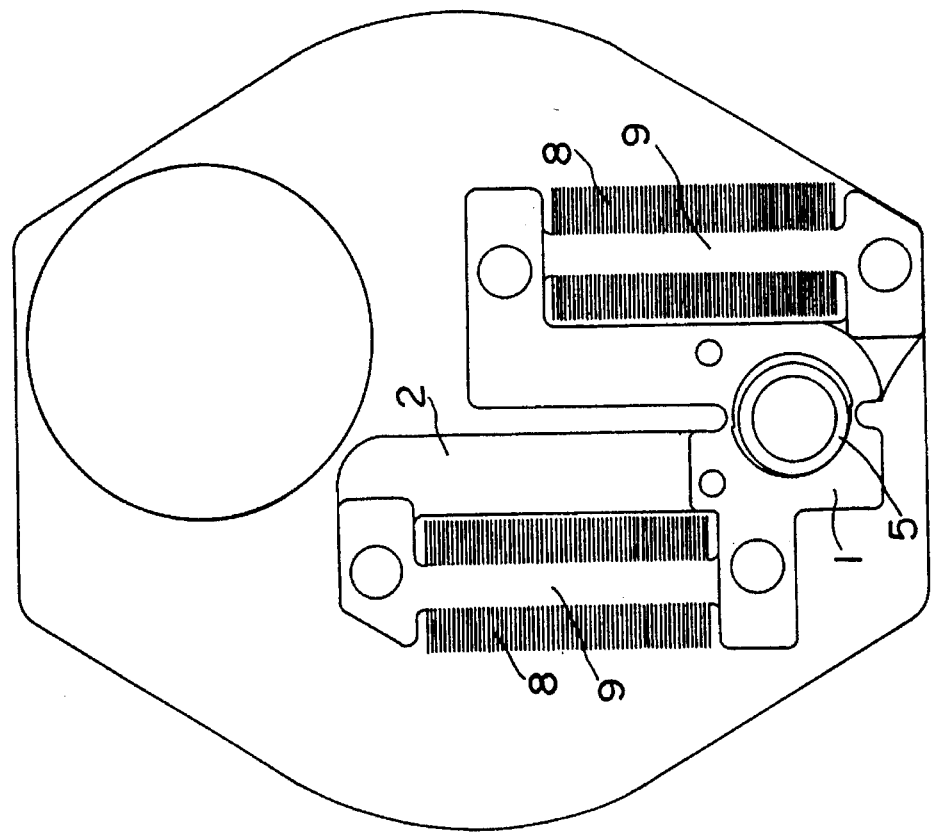
FIGS. 7 and 8 show the position of the motor in a watch.
Figure 8:
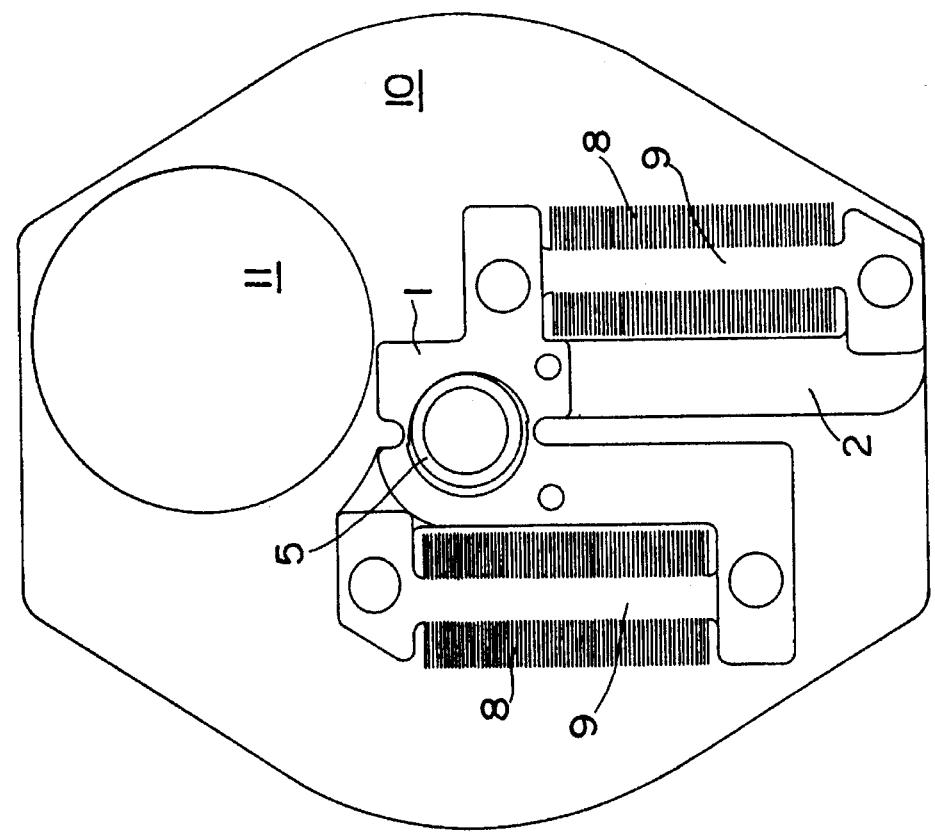

FIGS. 7 and 8 schematically show the possibilities for integrating the motor in a watch movement. According to FIG. 7, rotor 5 of the motor is disposed in the center of support 10 of the movement, while the free space is occupied by battery 11. The rotor is directly coupled to the seconds hand or the minute hand and to the gear-train for the actuation of the other hand(s).

According to FIG. 8, rotor 5 is offset with respect to the center of the movement, to which it is directly coupled by a small seconds hand.

It is also possible to obtain the same function with another shape of the openings or bores of the pole pieces than a circular one.

Figure 9:
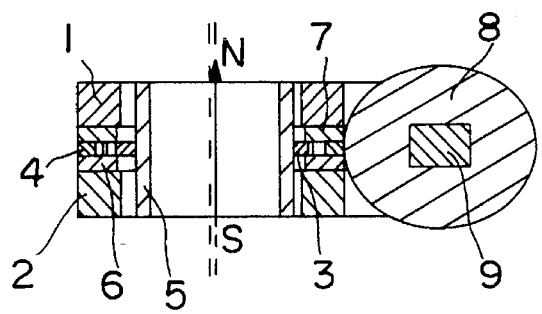
FIGS. 9 and 10 shows a single-coil embodiment of the motor.
Figure 10:
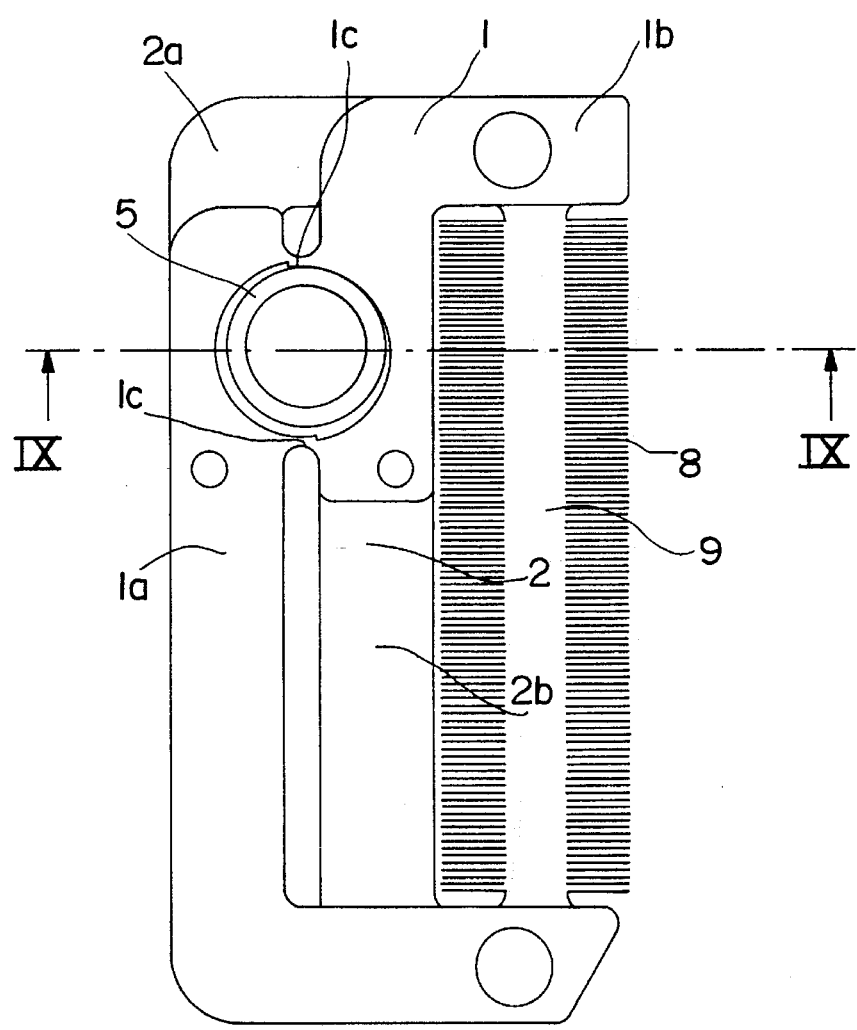

FIGS. 9 and 10 show a motor having a single coil 8. Pole pieces 1 and 2 are fixed on the opposing surfaces of core 9 at equal distances. Otherwise, the construction of the stator and of the rotor and the operation of the motor are the same as illustrated and described above.

We claim:

1. Epicycloidal step motor, comprising:

a cylindrical, magnetic rotor having an external toothing; and a stator having a single-phase winding, pole pieces and an inner toothing;

wherein said pole pieces surround said rotor, defining stable positions of said rotor and defining displacements of said rotor between said stable positions;

wherein said external toothing is in permanent engagement with said inner toothing;

wherein said rotor is a hollow cylinder axially magnetized; and wherein said pole pieces form a non-cylindrical opening.

2. The motor of claim 1, wherein said stator comprises two said pole pieces which are axially staggered and have opposed polarities when [the]said stator is excited.

3. The motor of claim 1, wherein said pole pieces have two essentially semi-cylindrical and eccentrical zones.

4. The motor of claim 3, wherein said two zones of the pole pieces are connected by restrictions.

5. The motor of claim 3, wherein said zones are formed by two cylindrical portions having different radii and different eccentricities.

6. The motor of claim 2, wherein bearings are disposed between said two pole pieces; and wherein said external toothing is axially guided between said bearings.

7. The motor of claim 1, wherein said stator comprises two coils; and wherein said two pole pieces are formed between said two coils.

8. The motor of claim 1, wherein said stator comprises a single coil; and wherein said two pole pieces are formed on opposite sides of said coil.

9. Epicycloidal step motor, comprising:

a axially magnetized rotor having an external toothing; and a stator comprising two pole pieces and an inner toothing;

wherein said pole pieces surround said rotor, defining stable positions of said rotor and causing displacements of said rotor between said stable positions;

wherein said external toothing is constantly engaging said inner toothing; and wherein said two pole pieces are axially staggered and have opposed polarities when said stator is excited.

10. The motor of claim 9, wherein bearings are disposed between said pole pieces and said external toothing of said rotor is axially guided between said bearings.

11. Epicycloidal step motor, comprising:

a magnetic rotor having an external toothing; and a stator comprising pole pieces and an inner toothing;

wherein said pole pieces surround said rotor, defining stable positions of said rotor and causing displacements of said rotor between said stable positions;

wherein said external toothing is constantly engaging said inner toothing; and wherein said pole pieces each have two essentially semi-cylindrical and eccentrical zones.

12. The motor of claim 11, wherein said two zones of said pole pieces are connected by restrictions.

13. The motor of claim 11, wherein each of said zones is formed by two cylindrical portions having different radii and different eccentricities.

* * * * *